United States Patent Office 3,427,368
Patented Feb. 11, 1969

3,427,368
PROCESS FOR FORMING A GEL WITHIN A CONTAINER
Ralph Anderson, Saratoga, Calif., assignor to United Aircraft Corporation, East Hartford, Conn., a corporation of Delaware
No Drawing. Filed May 15, 1967, Ser. No. 638,603
U.S. Cl. 264—3                6 Claims
Int. Cl. C10l 7/02; B01j 13/00

ABSTRACT OF THE DISCLOSURE

A method for filling a container with a gel formed by dissolving a solid in a solvent. The solid material is formed into Raschig rings, berl saddles or other configurations having a bulk density such that a container filled with solid material will be capable of receiving the amount of solvent required to form the gel. The container is subsequently filled with solvent and the gel is formed in situ.

BACKGROUND OF THE INVENTION

This invention is useful in many applications wherein it is desired to fill a container with a viscous gel but is particularly useful in the loading of napalm bombs. Napalm may be formed by dissolving a polymeric material such as polystyrene, polybutadiene, substituted polybutadiene, polyisoprene, copolymers of hydrocarbon dienes and vinyl hydrocarbons, and natural rubber, in highly flammable material such as gasoline, benzene, lower alcohols and ketones and various mixtures of such materials to produce a viscous, flammable gel which is then charged into a bomb casing, flame thrower assembly or other incendiary device or container. Because of the high viscosity of the napalm, large mixers are needed to mix the components and large pumps are required to pump the napalm into containers both of which have high power requirements.

While it would be desirable to load the bombs in the field, thereby eliminating expensive and unwieldy transportation problems as well as the danger accompanying storage and handling of loaded bombs, the mixers themselves are large, heavy, difficult to transport and vulnerable to enemy attack.

SUMMARY OF THE INVENTION

According to this invention a method of forming a gel in situ within a container is provided. The solid component of the gel is formed into a shape that reduces the random packed bulk density of the solid to the point that the void volume is sufficient to accommodate the amount of solvent necessary for the particular composition desired. The solid shapes are then filled into the container and at some subsequent time the container is filled with the solvent and closed. The gel is then formed within the container by the gradual dissolution of the solid which may be hastened by agitation of the container. This method is particularly useful in the loading of napalm bombs since it permits the casings to be loaded and shipped with only the relatively inert polymer within the casing. At some time prior to use generally from about 1 to 3 days in advance, the container is filled with solvent and the napalm will be formed within container in time for use. The containers may be rolled, inverted or otherwise agitated to hasten the gel formation.

In addition to providing a simple field loading technique which eliminates the need to mix and pump the viscous gel as well as the hazards encountered with storing and transporting large number of loaded napalm bombs this method also eliminates the time consuming weighing and measuring steps usually used to obtain the correct proportions of the solid and solvent. When the configuration of the solid material is properly selected to provide the void volume required to produce a predetermined ratio of solid and solvent, no weighing or measuring of the solid and liquid components is required. The container is merely filled with the appropriately configured solid material and subsequently filled with the liquid from drums or tanks containing the same.

It is accordingly an object of this invention to provide a method for forming a gel within a container.

It is another object of this invention to provide a method for charging a container with a predetermined ratio of solid and liquid materials.

It is another object of this invention to provide a method for field loading of napalm bombs. These and other objects of this invention will be readily apparent from the following descriptions of various embodiments thereof.

DESCRIPTION OF THE INVENTION

According to this invention the solid component of the gel is formed into a configuration that will reduce the random packed bulk density of the solid material. While any of a wide variety of configurations can be used, it is preferable to employ such known shapes as the Raschig ring, lessing ring, pall ring, partition ring, berl saddle, interlox saddle, tellerette or spiral shell configurations since a substantial amount of data is available relating to the void volumes of such configurations as a result of their use as column packing. Of these shapes the Raschig ring type is particularly useful since it can be readily and economically produced by cutting hollow tubing into desired lengths.

By appropriate selection of the configurations used void volumes of from about 15% to 90% can be obtained which permits wide latitude in the gel composition.

Example I

A napalm composition having an approximate composition by weight of 50% polystyrene, 25% gasoline and 25% benzene was prepared by filling a container with polystyrene Raschig rings, I.D. ⅛", O.D. ¼" and length ¼". Random packing of the rings produced a void volume of about 60% which, taking into consideration the different densities of solid and solvent, was required to accommodate about 50% by weight of the solvent. The container was then filled with a mixture of 50% by weight benzene and 50% by weight gasoline and closed. After 18 hours at 25° C. the mix was examined and there was no visual evidence of the tubes. A layer of fluid of approximately 15% of the total volume was noted above a more viscous layer of material. The container was inverted and allowed to sit for 18 hours and again examined. This time a more viscous layer constituting about 5% of the total volume of the container were noted at the top. The container was again inverted and allowed to sit for 18 more hours at which time a substantially homogeneous napalm gel, free of air bubbles was observed in the container.

Example II

The procedure of Example I was repeated using a mixture of 50% by weight gasoline and 50% by weight of methyl-ethyl-ketone as the solvent. Similar results were obtained.

In the above examples, a uniform gel was observed after 54 hours when the container was inverted twice in that time period. It is obvious that the time required for uniform gel formation can be materially reduced if the container is agitated more frequently. Another approach to reducing the time for gel formation is to decrease the thickness of the solid elements. Changing the wall thickness of the rings used in Examples I and II will produce some change in the void volume. If this change is greater than can be tolerated for a particular system it will be necessary to adjust the O.D. or length of the elements to produce the desired void volume. The void volume of any configuration can be readily determined experimentally by filling a container of known volume with the solid elements and then filling the container with an inert liquid, such as water in the case of polystyrene. The void volume can then be determined by measuring the volume of liquid in the container.

This invention has been described with respect to various embodiments thereof. These embodiments are illustrative rather than limiting and various modifications can be made without departing from the scope of the invention which is limited only by the following claims wherein:

I claim:

1. A method for forming a gel within a container by the introduction thereinto of first and second quantities of solid and liquid gel forming materials respectively, which said materials are capable of forming a gel from the amounts thereof so introduced, which method comprises the steps of:
   (a) introducing said quantity of solid material into said container, said solid material consisting of a plurality of elements having configurations selected from the group consisting of Raschig ring, lessing ring, pall ring, partition ring, berl saddle, interlox saddle, tellerette and spiral shell configurations, said elements producing a random packed void volume of from 15% to 90% and producing a void volume in said container sufficient to receive said second quantity of liquid material,
   (b) introducing said second quantity of liquid material into said container, and
   (c) closing said container.

2. The method of claim 1 wherein said container is filled with said solid material, and the void volume is subsequently filled with said liquid material.

3. The method of claim 1 further comprising the step of agitating said closed container to hasten gel formation.

4. The method of claim 2 whereby a flammable gel is produced within said container wherein said solid component is a polymeric substance and said liquid component is a flammable solvent for said polymeric material.

5. The method of claim 4 further comprising the step of agitating said closed container to hasten gel formation.

6. A method of forming a napalm composition within a container comprising the steps of:
   (a) filling said container with a plurality of elements formed of polystyrene said elements being configured to produce a random packed void volume of approximately 60%, and
   (b) filling said container with a flammable solvent selected from the group consisting of 50—50 mixtures by weight of gasoline and benzene and 50—50 mixtures by weight of gasoline and methyl ethyl ketone.

References Cited

UNITED STATES PATENTS

| | | | |
|---|---|---|---|
| 2,553,568 | 5/1951 | Finkelstein | 44—7 |
| 3,084,033 | 4/1963 | Kelley et al. | 44—7 |
| 3,027,597 | 4/1962 | McCurdy | 264—3 |
| 3,137,741 | 6/1964 | Vondersmith et al. | 264—3 |
| 3,205,286 | 9/1965 | Black | 264—3 |
| 3,236,611 | 2/1966 | Behnke et al. | 44—7 |
| 3,343,931 | 9/1967 | Doyle | 44—7 |

BENJAMIN R. PADGETT, *Primary Examiner.*

M. J. McGREAL, *Assistant Examiner.*

U.S. Cl. X.R.

44—7; 252—316